(12) United States Patent
Kuroda et al.

(10) Patent No.: US 6,621,175 B1
(45) Date of Patent: Sep. 16, 2003

(54) ENGINE CONTROL SYSTEM FOR HYBRID VEHICLE

(75) Inventors: Shigetaka Kuroda, Wako (JP); Atsushi Izumiura, Wako (JP); Shinichi Kitajima, Wako (JP); Atsushi Matsubara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/520,164

(22) Filed: Mar. 7, 2000

(30) Foreign Application Priority Data

Mar. 9, 1999 (JP) .......................................... 11-062411

(51) Int. Cl.⁷ .............................................. F02D 35/00
(52) U.S. Cl. ................. 290/40 D; 290/40 E; 290/40 F; 303/191; 303/192; 303/193; 303/113
(58) Field of Search ................................ 303/191–193, 303/113; 290/40 D–40 F

(56) References Cited

U.S. PATENT DOCUMENTS

| | | | | |
|---|---|---|---|---|
| 3,792,761 A | * | 2/1974 | Ball et al. ..................... 477/182 |
| 4,078,631 A | * | 3/1978 | Kadota et al. ................ 180/105 |
| 4,879,657 A | * | 11/1989 | Tamura et al. ......... 364/431.07 |
| 5,103,399 A | * | 4/1992 | Iwata et al. ............. 364/426.03 |
| 5,119,299 A | * | 6/1992 | Tamura et al. .......... 364/426.02 |
| 5,255,193 A | * | 10/1993 | Katayose et al. ....... 364/426.02 |
| 5,846,164 A | * | 12/1998 | Harada ........................ 477/205 |
| 5,950,595 A | * | 9/1999 | Yoshioka et al. ............ 123/295 |
| 5,984,429 A | * | 11/1999 | Nell et al. ................. 303/113.4 |
| 6,056,373 A | * | 5/2000 | Zechmann et al. .......... 188/353 |
| 6,120,414 A | * | 9/2000 | Endo et al. .................. 477/185 |
| 6,123,163 A | * | 9/2000 | Otsu et al. ................... 180/65.8 |
| 6,138,784 A | * | 10/2000 | Oshima et al. ............. 180/65.2 |
| 6,190,282 B1 | * | 2/2001 | Deguchi et al. ................ 477/5 |
| 6,203,468 B1 | * | 3/2001 | Nitta et al. ...................... 477/5 |
| 6,205,379 B1 | * | 3/2001 | Morisawa et al. ............. 701/22 |
| 6,215,198 B1 | * | 4/2001 | Inada et al. ............... 290/40 C |

(List continued on next page.)

FOREIGN PATENT DOCUMENTS

| | | |
|---|---|---|
| DE | 30 16 620 | 11/1981 |
| DE | 32 12 843 | 3/1983 |
| EP | 0 072 997 | 3/1983 |
| EP | 0 990 793 | 4/2000 |
| JP | 59-15650 | 1/1984 |
| JP | 8-317505 | 11/1996 |

OTHER PUBLICATIONS

Copy of European Patent Office Communication for corresponding European Patent Application No. 00104835 including European Search Report dated Jul. 27, 2001.

Primary Examiner—Karl Tamai
Assistant Examiner—Pedro J. Cuevas
(74) Attorney, Agent, or Firm—Armstrong, Westerman & Hattori, LLP

(57) ABSTRACT

An engine control system for a hybrid vehicle having an internal combustion engine and an electric motor as driving force sources, for permitting stopping and starting of the engine in accordance with predetermined drive conditions. The system includes a booster for receiving a negative pressure supplied by an operation of the engine, a pressure detector for detecting a pressure supplied to the brake booster, a throttle-opening state detector for detecting a throttle opening state and an engine-operation enable/disable determining device for determining whether or not to operate the engine when the engine is stopped, based on the throttle opening state detected by the throttle-opening-state detector and the pressure detected by the pressure detector.

2 Claims, 5 Drawing Sheets

U.S. PATENT DOCUMENTS

| | | | | |
|---|---|---|---|---|
| 6,233,508 B1 | * | 5/2001 | Deguchi et al. | 701/22 |
| 6,242,873 B1 | * | 6/2001 | Drozdz et al. | 318/139 |
| 6,283,559 B1 | * | 9/2001 | Yamada et al. | 303/113.3 |
| 6,294,843 B1 | * | 9/2001 | Kato et al. | 290/40 C |
| 6,296,592 B1 | * | 10/2001 | Eguchi et al. | 477/5 |
| 6,301,529 B1 | * | 10/2001 | Itoyama et al. | 701/22 |
| 6,305,757 B1 | * | 10/2001 | Ohsaki et al. | 303/114.3 |
| 6,307,276 B1 | * | 10/2001 | Bader | 290/40 C |
| 6,308,796 B1 | * | 10/2001 | Fuchs et al. | 180/169 |
| 6,314,347 B1 | * | 11/2001 | Kuroda et al. | 701/22 |
| 6,315,372 B1 | * | 11/2001 | Kroger et al. | 303/191 |
| 6,326,702 B1 | * | 12/2001 | Yonekura et al. | 290/40 A |
| 6,338,694 B1 | * | 1/2002 | Eguchi | 477/39 |
| 6,376,927 B1 | * | 4/2002 | Tamai et al. | 290/40 C |
| 6,404,072 B2 | * | 6/2002 | Onoyama et al. | 290/40 C |
| 6,470,983 B1 | * | 10/2002 | Amano et al. | 180/65.2 |
| 6,479,906 B2 | * | 11/2002 | Uchida | 290/40 C |

\* cited by examiner

ENGINE CONTROL SYSTEM FOR HYBRID VEHICLE

BACKGROUND OF THE INVENTION

1. Field of the Invention

This invention relates to an engine control system for a hybrid vehicle, and more particularly, to an engine control system which restarts the engine when the negative pressure or vacuum of the brake becomes insufficient when the engine is stopped, and during deceleration fuel supply cut.

This application is based on Japanese Patent Application No. 11-62411, the contents of which are incorporated herein by reference.

2. Description of the Related Art

Conventionally, hybrid vehicles which carry motors as power sources for driving the vehicles in addition to engines are known. Hybrid vehicles are divided into series hybrid vehicles and parallel hybrid vehicles. In the series hybrid vehicles, the engine drives a generator whose electric power output is used to drive the motor, which in turn drives the wheels. In the parallel hybrid vehicles, the motor coupled to the engine assists the rotation of the drive shaft of the engine while charging a battery with electric energy using the motor itself as a generator or using a separate generator.

Because the engines of such hybrid vehicles can constantly run within the engine-speed range of a high fuel mileage and a low emissions level or their drive loads can be reduced, the hybrid vehicles can achieve lower fuel consumption and lower emissions levels than conventional engine vehicles.

As disclosed in, for example, Japanese Unexamined Patent Application, First Publication Hei 8-317505, some of those hybrid vehicles are designed to be capable of stopping the operation of the engine in accordance with predetermined driving conditions.

Because of the ability to stop the operation of the engine, such a hybrid vehicle is superb in preventing over-charging of the battery or achieving a further improvement in fuel consumption but has the following problem.

As the throttle of a throttle-using engine, such as a gasoline engine, is manipulated in the closing direction, a negative pressure or vacuum is generally produced downstream of the throttle, so that such an engine is provided with a brake vacuum control unit which actuates a diaphragm by using the differential pressure between this negative pressure and the atmospheric pressure, thereby actuating the master cylinder in conjunction with the brake-pedal force. In a case where the engine of a hybrid vehicle equipped with the brake vacuum control unit stops operating under predetermined drive conditions, when the driver performs a brake manipulation, such as pumping, the negative pressure to be supplied to the master cylinder is reduced, making the absolute value of the negative pressure smaller. As a result, the required differential pressure between the negative pressure and the atmospheric pressure cannot be secured, lessening the capability to assist the brake-pedal force, which puts greater burden on the driver to manipulate the brake.

This kind of conventional technique is disclosed in, for example, Japanese Unexamined Patent Application, First Publication Sho 59-15650.

SUMMARY OF THE INVENTION

Accordingly, it is an object of the present invention to provide an engine control system for a hybrid vehicle, which can reduce the burden of brake manipulation on a driver.

To achieve this object, according to one aspect of this invention, an engine control system for a hybrid vehicle having an internal combustion engine (e.g., an engine E in one embodiment) and an electric motor (e.g., a motor M in the embodiment) as driving force sources for permitting stopping and starting of the engine in accordance with predetermined driving conditions, comprises: a brake booster (e.g., a brake vacuum control unit 4 in the embodiment) for receiving a negative pressure supplied by an operation of the engine; a pressure detector (e.g., a brake-vacuum sensor $S_6$ in the embodiment) for detecting a pressure supplied to the brake booster; throttle-opening-state detector (e.g., a throttle-opening-state sensor $S_2$ in the embodiment) for detecting a throttle opening state; and an engine-operation enable/disable determining device for determining whether or not to operate the engine when the engine is stopped, based on the throttle opening state (e.g., a throttle opening state TH in the embodiment) detected by the throttle-opening-state detector and the pressure (e.g., a brake-master-power negative pressure MPGA in the embodiment) detected by the pressure detector.

With the above structure, the engine-operation enable/disable determining device determines whether or not to operate the engine based on the pressure which is to be supplied to the brake booster and detected by the pressure detector and the throttle opening state detected by the throttle-opening-state detector.

The predetermined driving conditions for stopping the engine are, for example, based on the premise that the engine can be started by the motor (e.g., when a motor-start enable/disable flag F_MOTSTB is "1" in step S106 in the embodiment), the remaining battery charge (or the state of charge) SOC is equal to or above an over-discharge area (e.g., an energy-storage-zone flag F_ESZONE is "0" in step S107 in the embodiment), and an engine coolant temperature TW is equal to or higher than a predetermined level (e.g., the coolant temperature TW is equal to or higher than a coolant-temperature lower limit TWFCMG in step S108 in the embodiment).

The stopping of the engine operation includes conditions in which fuel supply is reduced or cut due to deceleration, from which the fuel supply returns to the normal state when a predetermined condition is met. When the conditions for stopping the engine are met (when an engine-stop control execution flag F_FCMG=1), fuel supply cut (fuel supply reduction) continues, and when continuous fuel supply cut makes it difficult to produce an engine load, resulting in a difficulty in supplying a negative pressure to the brake booster, the negative pressure can be generated by starting the engine. This helps to reduce the burden on the driver.

According to another aspect of this invention, the engine-operation enable/disable determining device: causes the engine to operate when the throttle opening state is other than completely closed (e.g., steps S203 and S213 in the embodiment), causes the engine to stop when the throttle opening state is completely closed and the pressure detected by the pressure detector is lower than a predetermined negative pressure (e.g., a brake-master-power negative pressure upper limit #MPFCMG at the time of stopping idling in the embodiment) which is equal to or lower than an atmospheric pressure (e.g., a decision in step S219 in the embodiment); and causes the engine to operate when the throttle opening state is completely closed and the pressure detected by the pressure detector is closer to the atmospheric pressure than the predetermined negative pressure which is equal to or lower than the atmospheric pressure (e.g., the decision in step S219 in the embodiment).

With this structure, when the driver performs a brake manipulation such as pumping so that the pressure detected by the pressure detector comes closer to the atmospheric pressure than the predetermined negative pressure, the engine is started. This can provide the negative pressure the brake booster calls for.

According to a further aspect of this invention, after the engine is restarted, the engine is not stopped until a vehicle speed exceeds a predetermined speed (a decision in step S119 in the embodiment).

This structure can prevent frequent repetition of the stop and start actions as in a case of heavy traffic, temporary stopping, restarting and so forth.

DETAILED DESCRIPTION OF THE PREFERRED EMBODIMENT

A preferred embodiment of the present invention will be explained with reference to the accompanying drawings.

Figure 1:
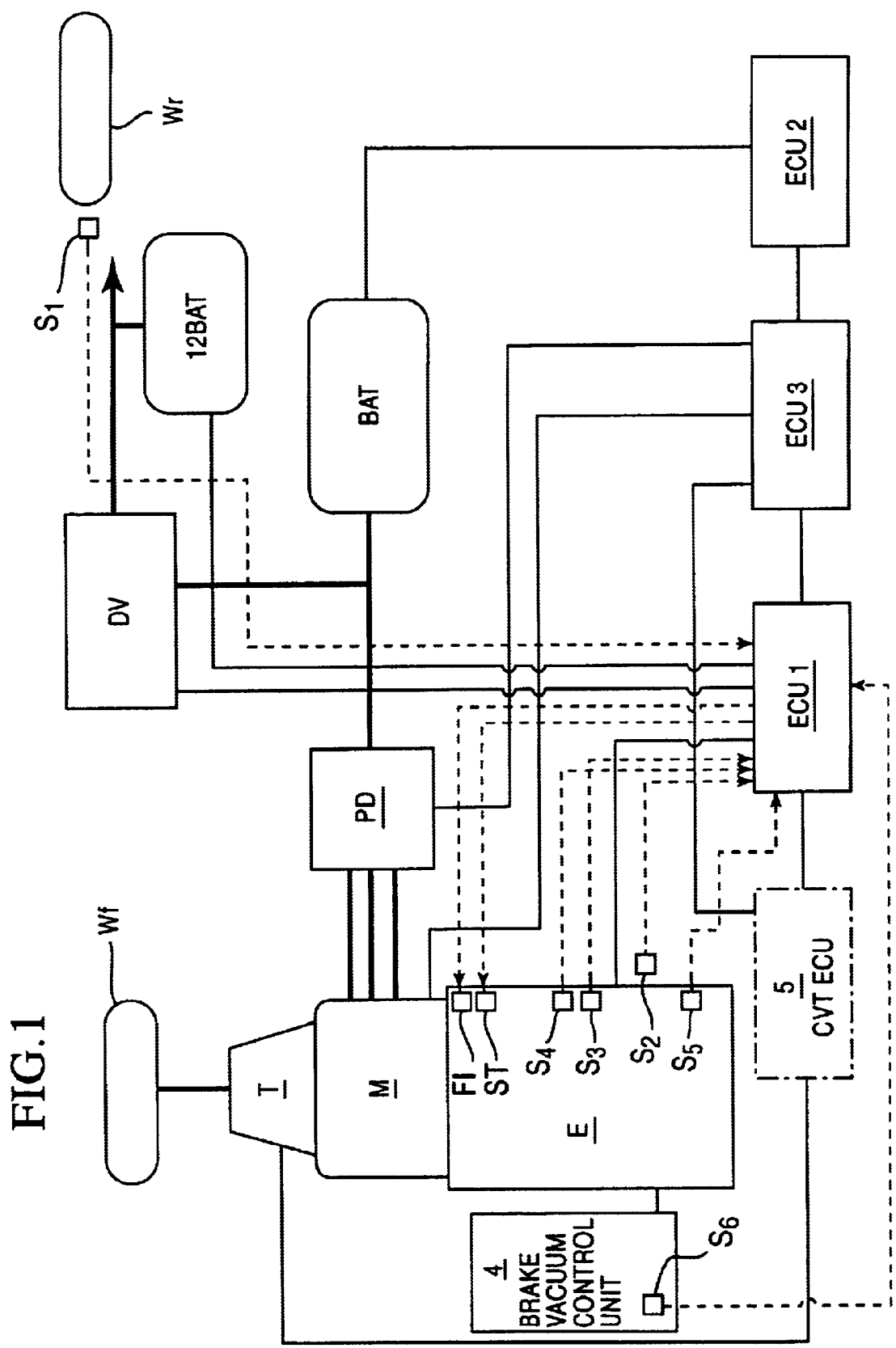
FIG. 1 is a schematic diagram showing the overall structure of one embodiment of this invention

FIG. 1 is a schematic diagram showing the overall structure of a parallel hybrid vehicle, specifically, a hybrid vehicle having a manual transmission system installed therein (including a vehicle in which a CVT (Continuously Variable Transmission) is installed). Driving forces from both an engine E and a motor M are transmitted via a transmission T, such as an automatic transmission or a manual transmission, to front wheels Wf which are the drive wheels. When the hybrid vehicle decelerates and the driving force is transmitted from the front wheels Wf to the motor M, the motor M acts as a generator to generate so-called regenerative braking force, so that the kinetic energy of the vehicle body is stored as electric energy.

A power drive unit PD performs the driving and regeneration of the motor M in response to control commands from a motor ECU 3. A high-voltage battery BAT for sending and receiving electric energy to and from the motor M is connected to the power drive unit PD. The battery BAT includes a number of modules connected in series, each module having a number of cells connected in series. The hybrid vehicle includes a 12-volt auxiliary battery 12BAT for driving various accessories. The auxiliary battery 12BAT is connected to the battery BAT via a downverter DV. The downverter DV, controlled by an engine ECU 1, reduces the voltage from the battery BAT and charges the auxiliary battery 12BAT.

A battery ECU 2, for example, computes the remaining charge (or the state of charge) SOC of the battery BAT. In FIG. 1, reference numeral "4" denotes a brake vacuum control unit, and the broken-line block 5 is a CVTECU.

The engine ECU 1 controls fuel supply amount controller F1 for controlling the amount of fuel supplied to the engine E, a starter motor ST, an ignition timing, etc. in addition to the motor ECU 3 and the downverter DV.

Therefore, the engine ECU 1 receives SOC information on the battery remaining charge from the battery ECU 2, motor information from the motor ECU 3 and signals from various sensors and various switches. The sensors include a vehicle speed (V) sensor $S_1$, a throttle-opening-state (TH) sensor $S_2$, engine coolant temperature (TW) sensor $S_3$, an engine intake-air temperature (TA) sensor $S_4$, an engine speed (NE) sensor $S_5$ and a brake-vacuum sensor $S_6$ for detecting the brake-master-power negative pressure. Those switches, though not illustrated, include an ignition switch, a reverse switch, a brake switch, a neutral switch and a clutch switch.

Based on the signals from the various sensors and the various switches, the SOC information and the motor information, the engine ECU 1 performs fuel supply cut and starting of the engine.

For a CVT-installed vehicle, N (Neutral), P (Parking) and R (Reverse) position switches are provided in addition to the neutral switch, reverse switch and clutch switch.

[Determination of Motor Operation Mode]

Figure 2:
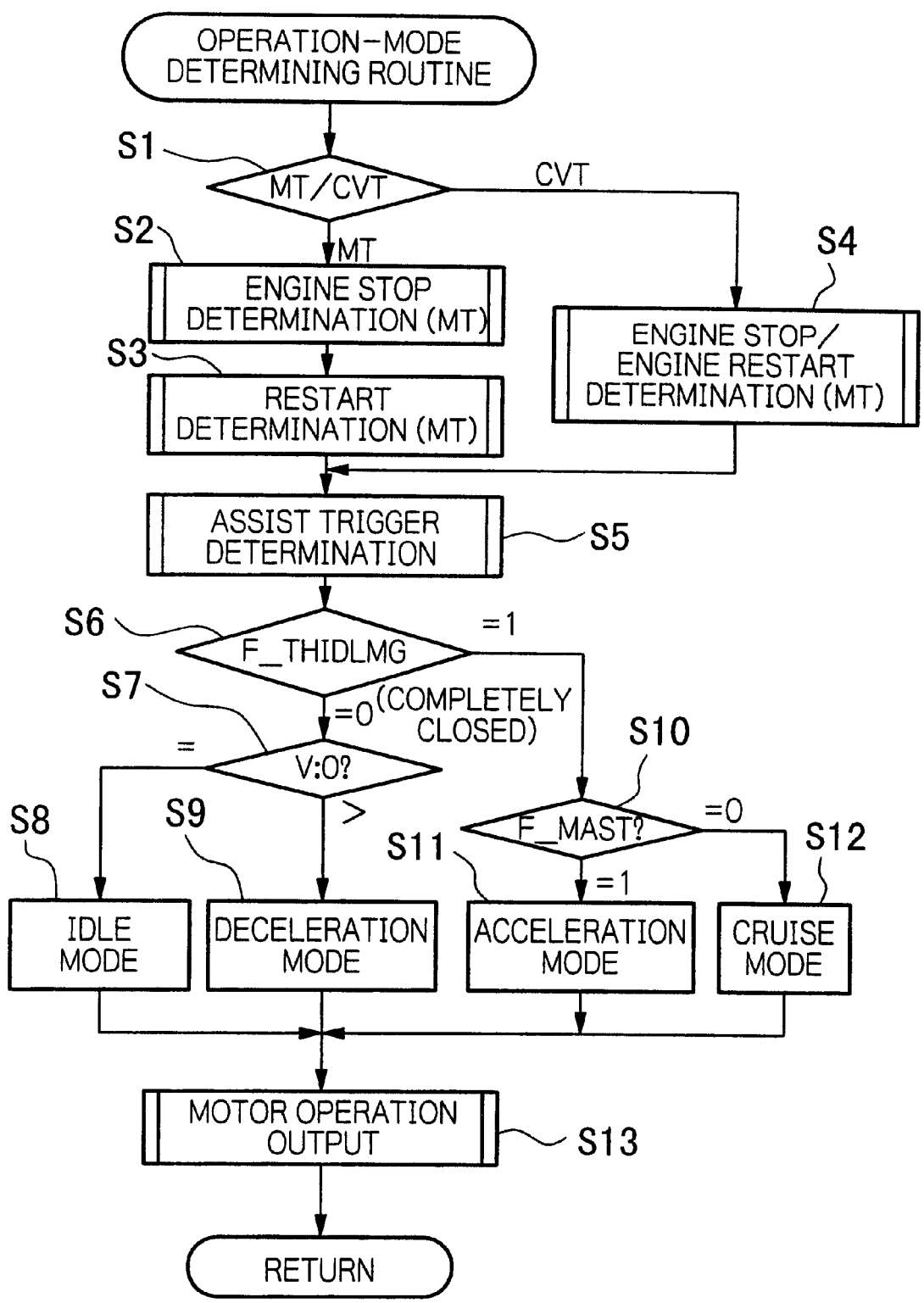
FIG. 2 is a flowchart showing a routine for determining the operation mode of a motor.

Referring to the flowchart of FIG. 2, the control mode for the motor of this hybrid vehicle will be explained.

In step S1, it is determined whether the vehicle is a manual transmission (MT) vehicle or a CVT vehicle. When it is determined that the vehicle is an MT vehicle, an engine stop determination (for MT vehicle) which will be discussed later is carried out in step S2. Then, a restart determination is performed in step S3 after which the flow proceeds to step S5.

When it is determined in step S1 that the vehicle is a CVT vehicle, an engine stop/engine restart determination (for CVT vehicle) which will be discussed later is performed in step S4. Then, the flow proceeds to step S5.

In step S5, an assist trigger determination is executed to determine whether or not to carry out assist by the motor. There are various assisting methods; for example, the determination can be made based on parameters such as the throttle opening state (e.g., throttle opening degree, or throttle opening amount) and the vehicle speed. Then, it is determined in step S6 whether the throttle is completely closed based on a throttle-completely-closed-state flag F_THIDLMG.

When in step S6 the throttle-completely-closed-state flag F_THIDLMG is "0", that is, when it is determined that the throttle valve is completely closed, and when it is determined in step S7 that the vehicle speed V is "0", that is, the vehicle is not running, the "idle mode" is selected in step S8, so that the engine E is maintained in an idling state.

When in step S6 the throttle-completely-closed-state flag F_THIDLMG is "0", that is, when it is determined that the throttle valve is completely closed, and when it is determined in step S7 that the vehicle speed V is not "0", the "deceleration mode" is selected in step S9 and regenerative braking by the motor M is carried out. Further, the regeneration energy is stored to charge the battery.

When in step S6 the throttle-completely-closed-state flag F_THIDLMG is "1", that is, when it is determined that the throttle valve is open, the flow proceeds to step S10. In this step S10, it is determined based on a motor assist flag F_MAST whether to select the "acceleration mode" or the "cruise mode".

When it is determined in step S5 that the assist by the motor M is required, and when it is determined in step S10 that the motor assist flag F_MAST is "1", the "acceleration mode" is selected in step S11, and the motor M assists the driving force of the engine E. When it is determined in step S10 that the motor assist flag F_MAST is "0", the "cruise mode" is selected in step S12, and the motor M is not driven so that the vehicle runs only on the driving force from the engine E. Accordingly, step S13 provides the output from the motor corresponding to each mode.

The following describes the "engine stop determination (MT)", the "restart determination" and the "engine stop/engine restart determination (CVT)" in the above-described flowchart.

[Engine Stop Determination (MT)]

Now, the engine stop determination for an MT vehicle will be discussed. In the engine stop determination, specifically, whether or not to permit the engine to stop is determined according to the running conditions of the engine and the driver's operation, basically on the condition that stopping the engine is permitted only when the start of the engine can be assisted by the motor.

Figure 3:
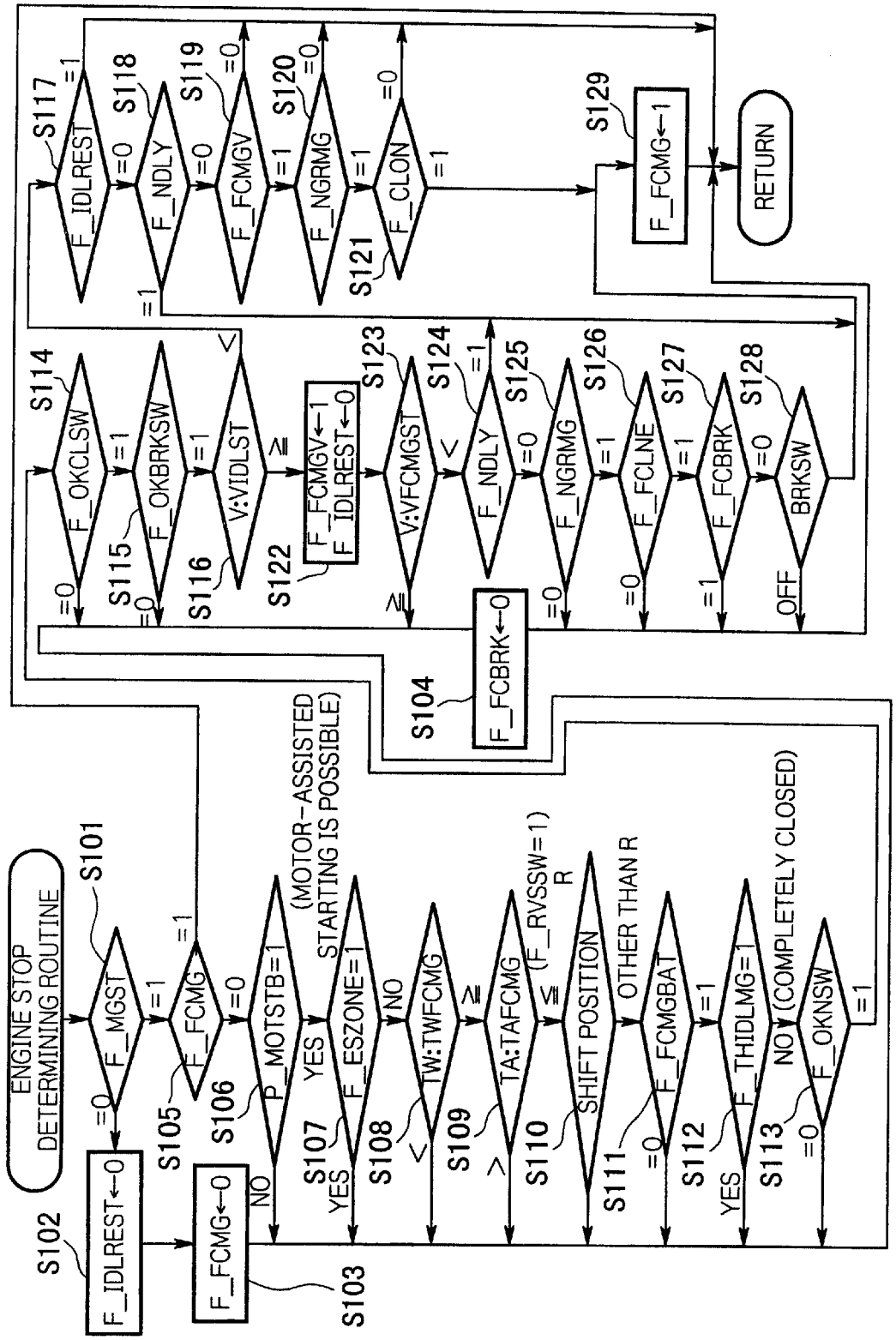
FIG. 3 is a flowchart illustrating a routine for determining whether or not to stop the engine of an MT vehicle.

FIG. 3 is a flowchart illustrating a routine for determining whether or not to stop the engine of an MT vehicle. The state of a start-switch-ON start flag F_MGST is determined in step S101 in this flowchart. When the start-switch-ON start flag F_MGST is "0", that is, when it is the first running, a restart flag F_IDLREST for restarting the engine by opening the throttle is set to "0" in step S102. Then, the engine-stop control execution flag F_FCMG is set to "0" in the next step S103. In the next step S104, "0" is set to a flag F_FCBRK which indicates that the brake is released while fuel supply cut originated from deceleration is continuing, after which the flow returns.

That is, at the time of first running, the individual flags are initialized by the operation from the ON action of the ignition switch to the ON action of the start switch.

When it is determined in step S101 that the start-switch-ON start flag F_MGST is "1" or it is not the first running, the state of the engine-stop control execution flag F_FCMG is checked in step S105. The decision here is made to distinguish the condition for stopping the engine from the condition for restarting the engine after the engine has stopped. When the flag F_FCMG was already "1", this step is passed and the flow returns to the operation-mode determining routine to execute the restart determination.

When it is determined that the engine-stop control execution flag F_FCMG is "0", it is then determined in step S106 if the motor start enable flag F_MOTSTB is "1", that is, if the starting of the engine by the motor is possible. Whether or not the start of the engine can be performed by the motor is checked by signals from the motor ECU 3. When it is determined that the flag F_MOTSTB is "0", the starting of the engine by the motor is not possible so that the flow goes to step S104. When it is determined that the flag F_MOTSTB is "1", the flow goes to step S107. Thus, if the starting of the engine by the motor is not possible, therefore, the engine will not be stopped.

In step S107, it is determined if the energy-storage-zone flag F_ESZONE is "1", that is, the battery's remaining charge SOC is in an over-discharge zone (e.g., 20% or smaller). This prevents the engine from being stopped when the battery's remaining charge is not much.

When the energy-storage-zone flag F_ESZONE is "1", that is, when it is determined that the battery's remaining charge SOC is in the over-discharge zone, the flow proceeds to step S104. When it is determined that this flag F_ESZONE is "0", i.e., that the battery's remaining charge SOC is not in the over-discharge zone, the coolant temperature TW is compared with the coolant-temperature lower limit TWFCMG (e.g., 40° C.) for stopping the engine in step S108.

When it is determined that the coolant temperature TW is lower than the coolant-temperature lower limit TWFCMG, the flow goes to step S104. This prevents the engine from being stopped when it is not in a fully warmed-up state. When it is determined that the coolant temperature TW is equal to or higher than the coolant-temperature lower limit TWFCMG, the intake-air temperature TA is compared with an intake-air temperature upper limit TAFCMG (e.g., 40° C.) for stopping the engine in step S109.

When it is determined that the intake-air temperature TA is higher than the intake-air temperature upper limit TAFCMG, the flow proceeds to step S104. Accordingly, when the intake-air temperature is high, the engine is not stopped in consideration of the deterioration of the startability and the air conditioning performance that should be secured. When it is determined that the intake-air temperature TA is equal to or lower than the intake-air temperature upper limit TAFCMG for stopping the engine, the flow proceeds to step S110.

In step S110, it is determined whether or not the shift position is the position R (Reverse). When a reverse switch flag F_RVSSW is "1", that is, when it is determined that the shift position is the position R, the flow proceeds to step S104. This prevents the engine from being stopped when the vehicle starts or stops at a low speed in the reverse mode, thus improving the operability. When it is determined that the shift position is other than the position R, the state of a large-consumption-in-12 V-system and restart enable flag F_FCMGBAT is determined in step S111. When it is determined that this flag F_FCMGBAT is "0", that is, when restarting the engine is not possible due to large consumption in the 12 V system, the flow advances to step S104. When it is determined that the flag F_FCMGBAT is "1", that is, when restarting the engine is possible even with large consumption in the 12 V system, the flow advances to step S112.

In step S112, it is determined whether or not the throttle-completely-closed-state flag F_THIDLMG is "1". When the flag F_THIDLMG is "1", that is, when it is determined that the throttle is not completely closed, the flow advances to step S104. As a result, the engine is not stopped. When the flag F_THIDLMG is "0", that is, when it is determined that the throttle is completely closed, the flow advances to step S113.

In step S113, the state of a neutral-switch-OK flag F_OKNSW is determined, and then the state of a clutch-switch-OK flag F_OKCLSW is determined in step S114. In the next step S115, the state of a brake-switch-OK flag F_OKBRKSW is determined.

Those steps S113, S114 and S115 determine if their associated switches are functioning adequately. When the switches are not failing, the respective flags are set to "1". When it is determined that the individual switches are normal, the flow advances to step S116. When each flag value is "0" because the associated switch is abnormal or is not checked as normal, the flow goes to step S104.

In step S116, the vehicle speed V is compared with an engine-stop-at-low-speed determining vehicle speed VIDLST (e.g., 3 km/h). This comparison allows fuel supply cut while the vehicle is running (at and after step S122) and the engine to be stopped when the vehicle is stopped (at and after step S117). This can improve the fuel consumption.

When it is determined in step S116 that the vehicle speed V is lower than the engine-stop-at-low-speed determining vehicle speed VIDLST, the state of the restart flag F_IDLREST for restarting the engine by opening the throttle is determined in step S117. When the flag F_IDLREST is "1" or when it is determined that the throttle is opened, the flow returns. Accordingly, when the engine is restarted by turning the ignition switch ON or opening the throttle while the engine is stopped, this flag value becomes "1" and the engine will not be stopped again until the vehicle starts moving.

When it is determined that the restart flag F_IDLREST is "0", the flow advances to step S118. In this step S118, the state of a neutral keeping flag F_NDLY is determined. When the neutral keeping flag F_NDLY is "1", that is, when it is determined that the neutral state is maintained for a predetermined time, the flow goes to step S129. When it is determined that this flag F_NDLY is "0", the flow goes to step S119 which determines the state of a flag F_FCMGV for checking if the vehicle speed has exceeded a predetermined vehicle speed after starting of the engine by the starter. The expression "after starting of the engine by the starter" means after restarting (the same is true in the following description).

When it is determined that the flag F_FCMGV is "0", the flow returns. When it is determined that the flag F_FCMGV is "1", the flow advances to step S120 to check the state of a flag F_NGRMG for determining if the gear in use is other than the first gear. When this flag F_NGRMG is "0", that is, when it is determined that the vehicle has stopped during or after running on the first gear, the engine is not stopped because there may be a mode in which the vehicle starts right after stopping, such as a temporary stop mode. In this case, therefore, the flow returns. When it is determined that this flag F_NGRMG is "1", the state of a clutch-thrust keeping flag F_CLON is determined in step S121. When the clutch-thrust keeping flag F_CLON is "0", the flow returns. When it is determined that the clutch-thrust keeping flag F_CLON is "1", the flow advances to step S129 to set the engine-stop control execution flag F_FCMG to "1" after which the flow returns. This causes the engine to stop when the vehicle is stopped without gear change with the clutch kept thrust at a gear position other than the first gear and reverse gear.

When it is determined in step S116 that the vehicle speed V is equal to or higher than the engine-stop-at-low-speed determining vehicle speed VIDLST, the flag F_FCMGV for checking if the vehicle speed has exceeded a predetermined vehicle speed after starting of the engine by the starter is set to "1", and the restart flag F_IDLREST for restarting the engine by opening the throttle is set to "0" in step S122. Then, the flow advances to step S123.

In step S123, the vehicle speed V is compared with a vehicle speed upper limit VFCMGST (e.g., 20 km/h) for maintaining fuel supply cut during deceleration. When it is determined that the vehicle speed V is equal to or higher than the vehicle speed upper limit VFCMGST, the flow advances to step S104. When it is determined that the vehicle speed V is lower than the vehicle speed upper limit VFCMGST, the flow advances to step S124 to determine the state of the neutral keeping flag F_NDLY.

When it is determined that the neutral keeping flag F_NDLY is "1", the flow advances to step S129. When it is determined that the neutral keeping flag F_NDLY is "0", the flow moves to step S125. In step S125, the state of the flag F_NGRMG is checked to determine if a gear other than the first gear has been used. When this flag F_NGRMG is "0", the flow returns. When the flag F_NGRMG is "1", the flow advances to step S126 to determine the state of a flag F_CLNE indicating that the engine speed NE at the time the clutch is thrust is greater than a predetermined value. The predetermined value here is, for example, 700 rpm.

When the engine speed NE at the time the clutch is thrust is greater than the predetermined value, it is determined that the flag F_CLNE is "0". In this case, the flow returns. When it is determined that the flag F_CLNE which indicates the result of the comparison of the engine speed NE at the time of thrusting the clutch with the predetermined value is "1", that is, when the clutch is free at an engine speed lower than the predetermined engine speed NE, fuel supply cut during deceleration is maintained. Then, the state of a flag F_FCBRK indicating the brake having been released while fuel supply cut in deceleration is kept is determined in step S127.

When it is determined that this flag F_FCBRK is "1", the flow returns. When it is determined that this flag F_FCBRK is "0", the state of the brake switch is determined in step S128. When it is determined that the brake switch is "OFF", the flow returns. When it is determined that the brake switch is "ON", the engine-stop control execution flag F_FCMG is set to "1" in step S129, after which the flow returns.

[Restart Determination]

Figure 4:
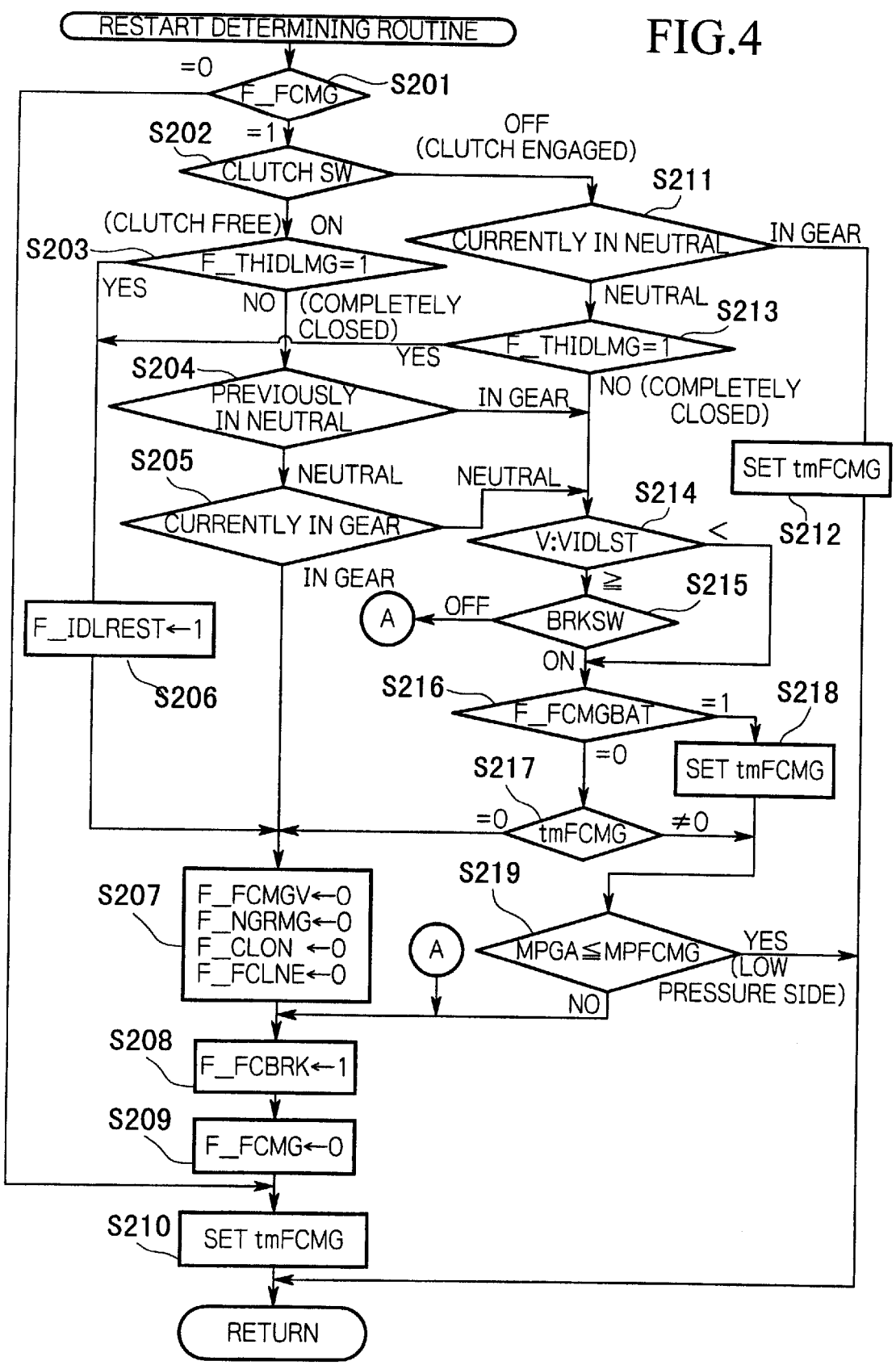
FIG. 4 is a flowchart illustrating a routine for determining whether or not to restart the MT vehicle.

FIG. 4 is a flowchart illustrating a routine for determining whether or not to restart the engine of an MT vehicle.

In the first step S201, the state of the engine-stop control execution flag F_FCMG is checked. Because the restart determination is performed when fuel supply cut by stopping the engine continues, when the engine-stop control execution flag F_FCMG is "0", this flowchart is passed, a restart-inhibiting delay timer tmFCMG when the remaining charge SOC of the battery goes below the lower limit is set in step S210, and the flow returns.

When the engine-stop control execution flag F_FCMG is "1", it is determined in step S202 whether the clutch switch is "ON" or "OFF". When in step S202 the clutch switch is "ON", that is, when it is determined that the clutch is free, it is then determined in step S203 if the throttle-completely-closed-state flag F_THIDLMG is "1."

When in step S203 the throttle-completely-closed-state flag F_THIDLMG is "1", that is, when it is determined that the throttle is not completely closed, the flow advances to step S206. In step S206, engine restart or returning from the fuel supply cut state is performed by opening the throttle and the restart flag F_IDLREST is set to "1". Stopping the engine or keeping fuel supply cut is therefore avoided by setting the flag this way.

In step S207, the flag F_FCMGV for checking if the vehicle speed has exceeded the predetermined vehicle speed after starter-oriented starting, the flag F_NGRMG for checking if the gear in use is other than the first gear, the clutch-thrust keeping flag F_CLON and the flag F_CLNE for checking if the engine speed NE at the time of thrusting the clutch is greater than the predetermined value are set to "0." In step S208, the flag F_FCBRK which indicates that the brake has been released during deceleration fuel supply cut is set to "1." In step S209, the engine-stop control execution flag F_FCMG is set to "0" after which the flow advances to step S210, and then the flow returns. This scheme prevents stopping of the engine, or fuel supply cut from being carried out again in other cases than the case where the gear is set to the neutral position again.

When in step S203 the throttle-completely-closed-state flag F_THIDLMG is "0", that is, when it is determined that the throttle is completely closed, the flow advances to step S204 to determine if the gear has previously been in the neutral position. When it is determined in step S204 that the previous gear position is the neutral one, it is then determined in step S205 if the transmission is currently in gear. When it is determined that the transmission is currently in gear, the flow advances to step S207 to restart the engine or return from the fuel supply cut state.

When it is determined in step S204 that the transmission has previously been in gear or it is determined in step S205 that the transmission is currently in neutral, the flow moves to step S214.

When in step S202 the clutch switch is "OFF", that is, it is determined that the clutch is engaged, it is then determined in step S211 if the transmission is currently in neutral. When it is determined in step S211 that the transmission is currently in gear, the flow returns after setting the restart-inhibiting delay timer tmFCMG in step S212. When it is determined in step S211 that the transmission is currently in neutral, it is determined in step S213 if the throttle-completely-closed-state flag F_THIDLMG is "1".

When it is determined in step S213 that the throttle-completely-closed-state flag F_THIDLMG is "1", the flow advances to step S206. If it is determined in step S211 that the transmission is in neutral and it is determined in step S213 that the throttle is thrust, restarting the engine or returning from the fuel supply cut state is carried out. When it is determined that the throttle-completely-closed-state flag F_THIDLMG is not "1" or the throttle is completely closed, the flow goes to step S214.

In step S214, the vehicle speed V is compared with the engine-stop-at-low-speed determining vehicle speed VIDLST. When it is determined that the vehicle speed V is lower than the engine-stop-at-low-speed determining vehicle speed VIDLST, the flow advances to step S216. When it is determined that the vehicle speed V is equal to or higher than the engine-stop-at-low-speed determining vehicle speed VIDLST, it is determined in step S215 if the brake switch is "ON" or "OFF". When in step S215 the brake switch is "OFF", the flow goes to step S208. When the brake is released during fuel supply cut while running, therefore, the engine returns from the fuel supply cut state. When the brake switch is "ON", on the other hand, the flow goes to step S216.

In step S216 is determined the flag F_FCMGBAT for determining whether or not to restart the engine based on the reduction in the remaining charge of the battery. When the restart flag F_FCMGBAT is "0", that is, when it is determined that the engine should be restarted because the battery's remaining charge has dropped, the flow advances to step S217.

When in step S216 the restart flag F_FCMGBAT is "1", that is, it is determined that restarting of the engine is unnecessary, the restart-inhibiting delay timer tmFCMG is set in step S218, and the flow then goes to step S219.

In step S217, the state of the restart-inhibiting delay timer tmFCMG is checked.

When in step s217 the restart-inhibiting delay timer tmFCMG is "0", the flow advances to step S207. When it is determined that the restart-inhibiting delay timer tmFCMG is not equal to "0", the flow advances to step S219.

In step S219, the absolute value of the brake-master-power negative pressure MPGA is compared with the absolute value of the brake-master-power negative pressure upper limit #MPFCMG (e.g., −430 mmHg). It is desirable that the brake-master-power negative pressure upper limit #MPFCMG be −465 mmHg, for example, when the vehicle is stopped, and be −540 mmHg when the vehicle is running in which state the negative pressure is easily secured.

When it is determined in this step that the brake-master-power negative pressure MPGA is equal to or lower than the brake-master-power negative pressure upper limit #MPFCMG ("YES"), a sufficient negative pressure is secured so that the flow returns without restarting the engine.

When it is determined that the brake-master-power negative pressure MPGA is closer to the atmospheric pressure than the brake-master-power negative pressure upper limit #MPFCMG ("NO"), the flow advances to step S208 to restart the engine.

In the case that the negative pressure of the brake-master-power negative pressure is likely to be gone due to pumping of the brake applied during stopping of the engine or the fuel supply cut process, the engine is restarted or the engine returns from the fuel supply cut state in order to secure the brake force, so that the brake-master-power negative pressure MPGA is secured. This can relieve the burden that would otherwise be placed on the driver due to an insufficient brake-master-power negative pressure MPGA.

[Engine Stop/Engine Restart Determination]

Figure 5:
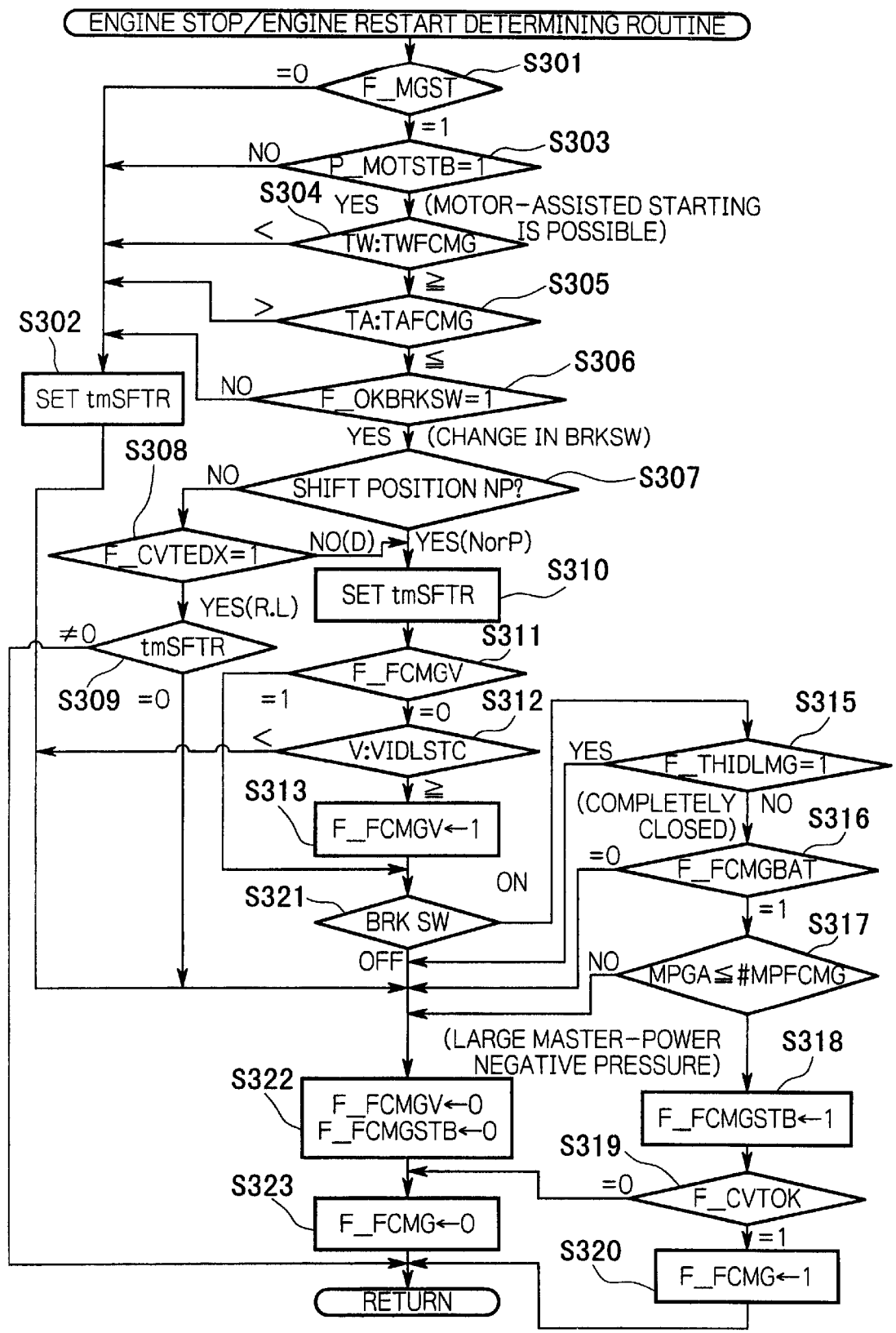
FIG. 5 is a flowchart showing a routine for a determination of engine stop/engine restart of a CVT vehicle.

The following describes the engine stop/engine restart determination for a CVT vehicle. FIG. 5 is a flowchart showing a routine for the determination of engine stop/engine restart of a CVT vehicle.

In step S301 in this figure, the state of the start-switch-ON start flag F_MGST is checked. When the start-switch-ON start flag F_MGST is "0", that is, when it is determined that it is the first running, a timer tmSFTR for waiting for stabilization of a change in shift range is set in step S302. In step S322, both the flag F_FCMGV for checking if the vehicle speed has exceeded a predetermined vehicle speed after starting of the engine by the starter and an engine-stop request flag F_FCMGSTB for the CVT are set to "0." Then, the engine-stop control execution flag F_FCMG is set to "0" in step S323 and the flow returns.

When in step S301 the start-switch-ON start flag F_MGST is "1", that is, when it is determined that it is not the first running, it is determined in step S303 whether or not communication information P_MOTSTB from the motor ECU 3 is "1". This communication information P_MOTSTB indicates that the motor-assisted starting of the engine is possible when it is "1", and indicates the motor-assisted starting of the engine is not possible when it is "0."

When in step S303 the communication information P_MOTSTB is "1", the coolant temperature TW is compared with the coolant-temperature lower limit TWFCMG below which the engine is to be stopped in the next step S304.

When it is determined that the coolant temperature TW is lower than the coolant-temperature lower limit TWFCMG, the flow advances to step S302. This prevents the engine from being stopped when the engine is not fully warmed up. When it is determined that the coolant temperature TW is equal to or higher than the coolant-temperature lower limit TWFCMG, the intake-air temperature TA is compared with the intake-air temperature upper limit TAFCMG above which the engine is to be stopped in step S305.

When it is determined that the intake-air temperature TA is higher the intake-air temperature upper limit TAFCMG, the flow advances to step S302. As a result, the engine is not stopped in consideration of the deterioration of the startability and the air conditioning performance that should be secured. When it is determined that the intake-air temperature TA is equal to or lower than the intake-air temperature upper limit TAFCMG, the flow proceeds to step S306.

In the next step S306, the state of the brake-switch-OK flag F_OKBRKSW is checked. This step checks if the brake switch is functioning properly, and a flag value of "1" is set when the switch is not failing. When it is determined that the brake switch is normal, the flow advances to step S307. When the brake switch is abnormal and the flag value is "0", the flow goes to step S302.

In step S307, it is determined if the shift position is in the N (Neutral) range, P (Parking) range or in another range.

When it is determined that the shift position is in a range other than the N range and P range, the state of a drive-range flag F_CVTEDX is determined in step S308. This drive-range flag F_CVTEDX indicates the D range when the decision value is "0" and indicates the R range or other ranges when the decision value is "1."

When in step S308 the drive-range flag F_CVTEDX is "1", the flow goes to step S310 to stop the engine. When the drive-range flag F_CVTEDX is "0", on the other hand, it is determined in step S309 if the shift-range stabilization waiting timer tmSFTR is "0." When in S309 the shift-range stabilization waiting timer tmSFTR is "0", the flow advances to step S322. When the shift-range stabilization waiting timer tmSFTR is not "0", the flow returns.

As the shift-range stabilization waiting timer tmSFTR is provided, even when the shift position passes the R range at the time the gear is shifted between the D range and the P range, the number of times of the engine is stopped by releasing the stopping of the engine is not reduced.

When it is determined in step S307 that the shift range is in the N range or the P range, the shift-range stabilization waiting timer tmSFTR is set in the next step S310 to stop the engine.

In the subsequent step S311 is checked the state of the flag F_FCMGV for checking if the vehicle speed has exceeded a predetermined vehicle speed after starting of the engine by the starter.

When it is determined that the flag F_FCMGV is "0", the flow advances to step S312 where vehicle speed V is compared with an engine-stop-at-low-speed determining vehicle speed VIDLSTC (e.g., 15 km/h).

When it is determined in step S312 that the vehicle speed V is lower than the engine-stop-at-low-speed determining vehicle speed VIDLSTC, the flow advances to step 322. When it is determined that the vehicle speed V is equal to or higher than the engine-stop-at-low-speed determining vehicle speed VIDLSTC, the flag F_FCMGV is set to "1" in step S313.

Those steps S311, S312 and S313 do not set the flags, that have been initialized (step S322) by restarting after the engine was stopped, to "1" until the vehicle speed V exceeds the engine-stop-at-low-speed determining vehicle speed VIDLSTC.

In a case of heavy traffic, temporary stopping and restarting or the like, stopping and restarting are likely to be frequently repeated. As in step S119 for an MT vehicle, therefore, once the engine is restarted, it will not be stopped again until it runs for a certain distance.

In step S321, the state of the brake switch is determined. When it is determined that the brake switch is "ON", the flow advances to step S315 to check the state of the throttle-completely-closed-state flag F_THIDLMG. When the throttle-completely-closed-state flag F_THIDLMG is "1", that is, when it is determined that the throttle is not completely closed, the flow goes to step S322. As a result, the engine is not stopped. When the throttle-completely-closed-state flag F_THIDLMG is "0", that is, when it is determined that the throttle is completely closed, the flow goes to step S316 to check the state of the flag F_FCMGBAT for determining whether or not to restart the engine based on the reduction in the remaining charge of the battery.

When this flag F_FCMGBAT is "0", that is, when it is necessary to restart the engine as a result of the battery's remaining charge having fallen, the flow goes to step S322. When the flag F_FCMGBAT is "1", that is, when restarting the engine originating from the reduction in the battery's remaining charge is unnecessary, the flow goes to step S317.

In step S317, the absolute value of the brake-master-power negative pressure MPGA is compared with the absolute value of the brake-master-power negative pressure upper limit #MPFCMG for determining whether to stop the engine.

When it is determined in this step that the brake-master-power negative pressure MPGA is equal to or lower than the brake-master-power negative pressure upper limit #MPFCMG ("YES"), the flow advances to step S318 to stop the engine.

When it is determined that the brake-master-power negative pressure MPGA is closer to the atmospheric pressure than the brake-master-power negative pressure upper limit #MPFCMG ("NO"), the flow goes to step S322 to restart the engine.

In the case that the negative pressure of the brake-master-power negative pressure is likely to be gone due to pumping of the brake applied during stopping of the engine or the fuel supply cut process, the engine is restarted or the engine returns from the fuel supply cut state in order to secure the brake force, so that the brake-master-power negative pressure MPGA is secured. This can relieve the burden that would otherwise be put on the driver due to an insufficient brake-master-power negative pressure MPGA.

Then, the engine-stop request flag F_FCMGSTB is set to "1" in step S318, and the state of a CVT-engine stop-OK flag F_CVTOK is checked in step S319. When the CVT-engine stop-OK flag F_CVTOK is "1", that is, when it is determined that the engine is ready to be stopped, the engine-stop control execution flag F_FCMG is set to "1", and then the flow returns. When the CVT-engine stop-OK flag F_CVTOK is "0", that is, when it is determined that the engine is not ready to be stopped, the engine-stop control execution flag F_FCMG is set to "0", after which the flow returns.

In the step S321, the state of the brake switch is checked. When it is determined that the brake switch is "OFF", both the flag F_FCMGV for checking if the vehicle speed has exceeded a predetermined vehicle speed after starting of the engine by the starter, and the engine-stop request flag F_FCMGSTB to the CVT are set to "0". Then, the engine-stop control execution flag F_FCMG is set to "0", after which the flow returns.

According to the first aspect of this invention, as described above, the engine-operation enable/disable determining device determines whether or not to operate the engine based on the pressure which is to be supplied to the brake booster and detected by the pressure detector and the throttle opening state detected by the throttle-opening-state detector. When the negative pressure to be supplied to the master cylinder decreases as the driver performs pedal manipulation, such as applying pumping brake, thus making the absolute value of the negative pressure smaller, the negative pressure of the brake booster can be secured by operating the engine. This can prevent a large burden from being put on the driver.

According to the second aspect of this invention, whether or not to stop the operation of the engine is determined based on the throttle opening state that indicates the driver's intention on driving and whether or not to permit the operation of the engine is determined based on the result of the detection made in the pressure detector. This brings about an effect of always permitting the brake booster to secure the negative pressure, and thus prevents a significant burden from being placed on the driver.

The third aspect of this invention has the advantage that the stop and start actions will not be frequently repeated in the case of heavy traffic or the like.

What is claimed is:

1. An engine control system for a hybrid vehicle having an internal combustion engine and an electric motor as driving force sources, for permitting stopping and starting of said engine in accordance with predetermined drive conditions, comprising:

brake booster for receiving negative pressure supplied by an operation of said engine;

pressure detector for detecting a pressure supplied to said brake booster;

throttle-opening-state detector for detecting a throttle opening state; and engine-operation enable/disable determining device for determining whether or not to operate said engine when said engine is stopped, based on said throttle opening state detected by said throttle-opening-state detector and said pressure detected by said pressure detector, wherein said engine-operation enable/disable determining device:

permits said engine to operate when said throttle opening state is other than completely closed;

causes said engine to stop when said throttle opening state is completely closed and said pressure detected by said pressure detector is equal to or less than a predetermined negative pressure which is equal to or less than an atmospheric pressure; and permits said engine to operate when said throttle opening state is completely closed and said pressure detected by said pressure detector is closer to the atmospheric pressure than the predetermined negative pressure which is equal to or less than the atmospheric pressure.

2. The engine control system according to claim 1, wherein after said engine is restarted, said engine is not stopped until a vehicle speed exceeds a predetermined speed.

* * * * *